United States Patent Office 3,425,959
Patented Feb. 4, 1969

3,425,959
NONPYROPHORIC RANEY-TYPE CATALYSTS BY TREATMENT WITH AN OXIDIZING AGENT
André Haddad, Paris, France, assignor to Institut Francais du Petrole des Carburants et Lubrifiants, Rueil-Malmaison, France
No Drawing. Filed June 14, 1965, Ser. No. 463,900
Claims priority, application France, June 13, 1964, 978,232
U.S. Cl. 252—459
Int. Cl. B01j *11/22, 11/32*
18 Claims

ABSTRACT OF THE DISCLOSURE

To decrease their pyrophoricity, and to increase their storability in the dry state, Raney catalysts are treated with an aqueous solution of an oxidizing agent at a pH higher than 3, preferably 5–11, the amount of oxidizing agent being critical and necessarily less than the maximum amount consumable by the catalyst, the critical amount being preferably 20–80%, more preferably 30–60% of the maximum, and the oxidizing agent being preferably a hypochlorite.

---

This invention relates to metallic catalysts, in particular to catalysts of the Raney-nickel type and to a process for stabilizing such catalysts against the effect of atmospheric air to reduce or eliminate their pyrophoric properties without significantly affecting their catalytic activity.

Catalysts, such as Raney nickel or Raney cobalt, though highly active and utilized to a signficant extent in industry, are limited in their employment because of their pyrophoric properties. Such catalysts, when exposed to an oxidizing atmosphere, particularly to air, are oxidized so rapidly that they actually become incandescent and/or lose their catalytic activity.

Consequently, these metallic catalysts are generally stored under a liquid, generally alcohol or water. At the time of their utilization, however, they quite frequently must be transferred to another liquid which is insoluble in the storage liquid. This latter step is a lengthy and delicate operation which considerably increases the cost of, and reluctance to, employing such catalysts.

As a result of the difficulties attendant to the employment of the pyrophoric catalysts, there is a general industrial preferance to the use of metal catalysts which are deposited on supports, notwithstanding the fact that the catalytic activities of the latter catalysts are less than Raney-nickel type catalysts and that the supported catalysts lead to undesired side reactions due to the activity of the support material. For example, in the hydrogenation of benzene to cyclohexane, supported catalysts yield a substantial amount of methyl cyclopentane, whereas the latter compound is not formed at all in the presence of Raney nickel catalysts which are one hundred percent selective for the formation of cyclohexane.

Realizing this enigma, investigation have attempted to lessen the sensitivity of Raney-type catalysts against air, but without significant success. For example, one suggestion is to treat the pyrophoric catalyst with inert gases containing traces of oxidizing gases and gradually increasing the proportion of the oxidizing gases with respect to time. From the standpoint of operating this process, it must be operated very slowly to avoid an excessive increase in temperature. Even so, this method results in local hot spots which are exceptionally difficult to measure, much less control, thereby making it impossible, for all practical purposes, to maintain the desired activity of the catalyst.

Aside from the percedingly described difficulty controllable gas phase process, experiments have been conducted with chemical oxidizing agents, but they have resulted in highly irregular results with respect to the reduction of the pyrophoric property, and also have deleteriously inhibited the catalytic activity of the catalyst.

A principal object of this invention, therefore, is to provide highly active Raney-nickel type catalysts which are substantially non-pyrophoric in atmospheric oxygen, and can be employed in the dry state without any special precautions.

Another object of this invention is to provide a process for the production of such improved catalysts.

Upon further study of the specification and claims, other objects and advantages of the present invention will become apparent.

To attain the objects of this invention, there is provided a process comprising treating a Raney-type catalyst with a chemical oxidizing agent in an aqueous solution, the ratio of said oxidizing agent to catalyst being a critical variable for the production of active, air-insensitive catalysts. It is also important for the oxidizing agent to be employed in a basic, neutral, or weakly acidic solution having, for example, a pH higher than 3, preferably 5 to 11. Whereas higher pH values can be employed without difficulty, if highly acidic solutions are used, they result in an excessive attack of the metal.

To derive the critical ratio of the oxidizing agent, it is first necessary to determine the maximum amount of oxidizing agent which the catalyst can consume. This maximum amount of oxidizing agent appears to be consumed in two reactions, one for superficial metal oxidation and the other for oxidizing hydrogen occluded in the catalyst. It is to be understood, however, that this theoretical explanation is not to be considered as a limiting aspect of this invention, inasmuch as the manipulative procedure as outlined hereinafter is all that is required to carry out the invention successfully.

With respect to the critical ratio, it is only necessary to employ less than the maximum amount of oxidizing agent to obtain beneficial results. It is preferred, however, that this amount be in the range of 20–80% of the maximum, even more preferably 30–60%, inasmuch as these preferred ranges yield a substantial, if not complete, suppression of the pyrophoric properties of the catalyst without any significant modification of catalyst activity. If there are used proportions of oxidizing agents higher than 100% of the maximum, the activity of the catalys is at least partially destroyed, and high proportions can lead to total catalyst poisoning. Even at the range of 80–100% of the maximum quantity there is observed a slight but noticeable inhibition of the catalyst activity. On the other hand, if a proportion of oxidizing agent of below 20% of the maximum is employed, the reduction of the pyrophoric character of the catalyst is insufficient from an industrial standpoint.

To determine the maximum quantity of active oxygen consumed by the catalyst, a preliminary test must be conducted. This test is best effected by reacting a sample of the catalyst with an aqueous solution of a hypochlorite, preferably a hypochlorite of sodium, potassium or calcium, or an equivalent oxidizing agent. By equivalent oxidizing agent is meant any chemical substance which is reduced by the pyrophoric catalyst to the same extent as a hypochlorite. By way of example hydrogen peroxide is such a chemical substance. This can be done by a redox titration or any other conventional method to discover the maximum quantity of active oxygen that can be consumed by the particular catalyst.

A first method consists of contacting a sample of the catalyst with an excess of oxidizing agent in aqueous solution, preferably a hypochlorite, at a temperature in the advantageous range of 0–100° C., preferably 20–50° C., at a concentration preferably corresponding to 0.01–25 volumes of active oxygen per volume of solution. The excess of oxidizing agent is titrated by the iodometric method, by means of potassium iodide, for example.

A second method consists of adding stepwise the oxidizing agent to the sample of catalyst contained in a calorimeter and following the corresponding temperature increase. The total amount of oxidizing agent which provokes temperature increases corresponds to the maximum amount of active oxygen which is consumed by the catalyst, taking into account the definition of "active oxygen" given hereinafter.

A preferred way of operating consists of using the same temperature and concentration conditions and the same oxidizing agent for the preliminary test and the main treatment of this invention.

In practice, it has been discovered that the maximum proportion of active oxygen generally consumed by the catalyst is between 25 and 200 cc./g., more particularly in the narrower range of 40 to 100 cc./g. (1 cc. active oxygen at 0° C. and 760 mm. Hg is equal to 0.0446 millimoles of $O_2$).

Taking cognizance of the latter ranges, it can then be estimated that in the majority of cases satisfactory results can be obtained by employing a proportion of oxidizing agent which corresponds to more than 5 liters up to about 200 liters of active gaseous oxygen (S.T.P.) per kilogram of catalyst. Likewise, better results should be obtained with a preferred quantity of 8 to 80 liters of active oxygen per kilogram of catalyst. The utilization of higher proportions of active oxygen would poison the catalyst.

Conversely, it has been noted that if low proportions of active oxygen are employed which appear to inhibit the pyrophoric property of the catalyst, this property is regenerated when the catalyst is subsequently used in a hydrogenation reaction. In contrast, if a proportion of active oxygen higher than about 60% of the maximum quantity is employed, the catalyst permanently loses its pyrophoric properties without the possibility of its regeneration, and at the same time there is no loss in the catalyst activity.

The term "active oxygen" is defined as the theoretical quantity of oxygen which can be liberated by a chemical oxidation agent when it is reduced. For example, 1 mole of sodium hypochlorite can liberate one-half mole of active oxygen, according to the following equation:

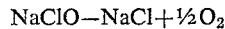

$$NaClO \rightarrow NaCl + \tfrac{1}{2} O_2$$

Whereas chemical oxidizing agents hereinafter defined can be employed for treating the catalyst, it has nevertheless been discovered that the hypochlorites of sodium, potassium and calcium yield superior results. Other chemical oxidation agents are less preferred, for example, hydrogen peroxide, chlorates and perchlorates, particularly the sodium and potassium salts of the latter two agents. When hydrogen peroxide is used, it is preferable to employ a pH between 5 and 7.

By "oxidizing agent," there is meant any chemical compound which is reduced when contacted with a Raney catalyst at a temperature in the range of 0–100° C.

The concentration of the oxidizing solution is not critical, but it is preferred to avoid excessively concentrated solutions corresponding, for example, to more than 25 volumes of active oxygen per volume of solution. If higher concentrations are employed, there will be a rapid reaction rate, leading to a build-up of excessively high temperatures which will detract from the usefulness of these solutions. On the other hand, concentrations of oxidizing agents lower than 0.01 volume of active oxygen per volume of solution are less efficient and necessitate the utilization of excessive quantities of oxidizing solution.

The reaction temperature can be varied, it being advantageous to employ a temperature of 0–100° C. It is preferable, however, to use slightly elevated temperatures, for example between 20 and 50° C.

The reaction time required for treating the pyrophoric catalyst is not critical inasmuch as a finite improvement is obtained after only a few seconds of contact between the catalyst and the oxidizing solution. It is preferable, though, to maintain the reaction for at least more than one minute, and it can be beneficially prolonged up to one hour. Even with longer reaction times, however, no harmful effects arise.

This invention is particularly advantageous for the treatment of catalysts obtained by the selective decomposition of alloys, such as Ni-Al, Co-Al, Co-Si, or Ni-Si by reacting same with a strong mineral base such as sodium hydroxide or potassium hydroxide. The resultant reaction products are sponge-like compositions of elemental nickel or cobalt and are classically defined as Raney catalysts. These catalysts, after being treated with a strong aqueous base, are subjected to a prolonged washing operation to eliminate residual base. With respect to the washing step, it is permissible and convenient to add the oxidation agent of this invention to the wash water at any chosen time.

For further teachings relating to the production of Raney nickel, reference is invited to United States Patents 1,628,190 and 1,915,473, as well as journal articles Covert, Adkins, JACS 54, 4116 (1932); Ruggli, Preiswerk, Helv. Chim. Acta 22, 494 (1939); Mozingo, Org. Syn. 21, 15 (1941). Furthermore, according to "The Merck Index of Chemicals and Drugs," seventh edition, Merck & Co., Inc. Rahway (1960), page 896, Raney nickel loses its hydrogen slowly on storage and becomes inactive. Properly prepared and stored (generally under alcohol, ether, water, methyl cyclohexane, or dioxane) it should remain active for six months.

In contrast thereto, a dry catalyst according to this invention has lost only 5% of its activity after 6 months' storage in a corked flask without special care to avoid access of air.

The catalyst can be employed either after it has been treated with the oxidizing agent or after it has been dried, for example under either a reduced pressure or a current of gas, preferably inert, at preferably between 20 and 100° C. Once dry, the catalyst can be stored in contact with air.

If the resulting catalyst of this invention is to be employed in dehydrogenation reactions, it is preferred to subject the previously dried catalyst to a pretreatment with hydrogen, at a temperature between for example 0 and 200° C., the pressure of hydrogen being, for example, 0.1 to 50 kg./cm.² In certain cases, this hydrogen pretreatement can also be utilized to advantage on catalysts which are to be employed in a hydrogenation reaction.

To distinguish the catalysts of this invention from conventional Raney catalysts, or those which have been treated by prior art processes to reduce the pyrophoric properties thereof, it will be noted that they generally have the following basic composition:

| | Percent by weight |
|---|---|
| Al | 0–8, preferably 1–5 |
| Ni and/or C | 70–95, preferably 80–90 |
| O | 0–30, preferably 5–20 |
| H | 0–1.5, preferably 0.4–1 |

Traces of other elements may also be present, for example 0–1% by weight of iron.

A normal pyrophoric catalyst has usually the following composition:

|  | Percent by weight |
|---|---|
| Al | 0–20 |
| Ni and/or Co | 75–100 |
| O | Nil |
| H | 0.4–3.8 | plus eventual traces of other elements as above.

The catalysts of this invention can be utilized in all those processes wherein untreated catalysts of this type such as, for example, Raney nickel, can be employed, the operating conditions being unmodified, e.g., hydrogenation of benzene to cyclohexane at 100–300° C.

Without further elaboration, it is believed that one skilled in the art can, using the preceding description utilize the present invention to its fullest extent. The following preferred specific embodiments are, therefore, to be construed as merely illustrative, and not limitative of the remainder of the specification and claims in any way whatsoever.

Example 1

110 g. of pyrophoric Raney nickel obtained by the reaction of an alloy of 50% by weight of aluminum and 50% by weight of nickel with an aqueous solution of 25% caustic soda are washed with water until a pH of 9 is obtained.

To determine the maximum amount of oxidizing agent as previously explained in this invention, a sample of 10 grams of the washed Raney nickel is reacted with an aqueous sodium hypochlorite solution having a chlorometer reading of 12°. In this case, the catalyst consumes 75 cc. of active oxygen per gram.

The remainder of the washed Raney nickel catalyst is then washed with 200 cc. of water at 20° C. and under agitation there is progressively introduced during a period of 20 minutes 600 cc. of an aqueous sodium hypochlorite solution having a concentration of 12 chlorometric degrees (one volume of solution corresponds to 12 volumes of gaseous chlorine or 6 volumes of active oxygen). The reaction temperature during the course of the treatment increases from the starting temperature of 20° C. to a final temperature of about 30° C.

The resultant treated catalyst is then washed with water without any special safety measures until the wash water exhibits a pH of 7. After decantation, the catalyst is dried under a pressure of 30 mm. Hg at a temperature of 40° C. for a period of 8 hours. The nickel thus obtained appears as a grey, brilliant, and very fine powder, and is characterized by being preservable in air.

After this catalyst has been exposed to air for 8 days, 5 g. are introduced into a pressure-resistant apparatus, such as an autoclave. Two liters of cyclohexane are added thereto, and the temperature is raised to 200° C. Thereafter, benzene is introduced at a rate of 500 g. per hour, together with hydrogen at a rate of 600–650 liters per hour (at 20° C. and 760 mm. Hg), the total pressure reaching a value of 25 kg./cm.$^2$. By cooling the apparatus, the temperature is maintained at 200° C. The unconsumed hydrogen leaving the apparatus entrains vaporized reaction produce which is then condensed.

By this reaction, 520 g./h. of cyclohexane are obtained during the course of 100 hours of operation, the cyclohexane having a purity of 99.99–99.95%. Upon cooling the gases to low temperatures, another 15 g./h. of cyclohexane can be recovered, if desired. The purity of the cyclohexane was determined by melting point, UV spectrography, and gas phase chromatography. These analyses indicated that, in total, the 52 kg. of cyclohexane contained only 200 p.p.m. of benzene and exhibited a melting point of 6.43° C.

At the termination of the experiment, it is to be noted that the catalyst regained its pyrophoric properties.

Example 2

For purposes of comparison, Example 1 is repeated with respect to the hydrogenation of benzene, with the exception that a pyrophoric nickel catalyst is employed, as obtained in the manner indicated at the beginning of Example 1, i.e., without any further treatment of sodium hypochlorite. The results of this experiment, on the one hand, indicate that there is no difference with respect to the yield or purity of the produced cyclohexane. On the other hand, because of the pyrophoric properties of the catalyst, it is necessary to employ the strict precautionary measures to prevent the benzene from going up in flames.

Example 3

Example 1 is repeated except that 1800 cc. of an aqueous potassium hypochlorite solution is employed having a concentration of 6 chlorometric degrees, being equivalent to 72% of the theoretical maximum quantity of active oxygen.

The results of the benzene hydrogenation are not significantly modified, but the separated catalyst at the end of the hydrogenation step does not resume its pyrophoric character. This latter fact facilitates the venting and cleaning of the reaction apparatus, and furthermore avoids the requirement for additional safety measures.

The just-described experiment is again repeated, but with an aqueous solution of calcium hypochlorite, all other things being equal. Equivalent results are obtained.

Example 4

Example 1 is repeated, but only one gram of the catalyst is employed to accomplish the benzene hydrogenation. The rate of benzene introduction is then lowered to 400 g./h. in order to obtain a product of the desired purity. In this latter connection, the purity of the resultant cyclohexane which attains a value of 99.97% at the beginning of the experiment is progressively lowered to a purity of 96% during the course of a 15-hour reaction time.

Example 5

For the purposes of comparison, Example 4 is repeated but a pyrophoric Raney nickel catalyst is employed which was not subjected to any insensitizing treatment. The results of this experiment show that the purity of the resultant cyclohexane is exactly the same, being 99.97% at the beginning of the experiment and then progressively decreasing to 96%.

As a consequence of this example in comparison with Example 4, it is readily appreciated that the hypochlorite treatment does not significantly modify the normal catalytic activity of Raney nickel. Conversely, the handleability and storageability of the catalyst is dramatically improved.

Example 6

Example 1 is repeated, but with the replacement of the hypochlorite solution with 450 cc. of an aqueous 10% by volume solution of hydrogen peroxide, representing 60% of the maximum quantity of active oxygen. The resultant catalyst exhibits the same activity as that produced in Example 1, but it remains somewhat sensitive to air, thereby indicating the superiority of the hypochlorite solution over that of hydrogen peroxide.

Example 7

Example 1 is repeated but with a catalyst capable of consuming 110 cc. of active oxygen per gram, all other things being equal. The relative proportion of the active oxygen in the hypochlorite solution is then equivalent to 33% of the maximum amount which could be consumed by the catalyst. When this catalyst is employed to hydrogenate benzene, as in Example 1, the same results are obtained.

Examples 8 through 10

These examples are submitted for purposes of comparison. Example 1 is repeated three times while each time utilizing a different volume of hypochlorite solution, to wit, 125, 1500 and 1875 cc., corresponding to the following percentages of the maximum quantity of active oxygen of 10%, 120% and 150%. The following results are obtained in in the hydrogenation of benzene under the experimental conditions given in Example 1:

Example 8

For a 10% proportion of the maximum oxygen, there are obtained the same results as in Example 1, but the catalyst was still pyrophoric, igniting spontaneously in air.

Example 9

For 120% of the proportion of the maximum active oxygen, an initial purity of cyclohexane of 99.99% is obtained, with a reduced benzene rate of 400 g./h. However, after the fortieth hour, the purity of the cyclohexane drops to 95%. This latter value is to be compared with the 99.95% purity of the cyclohexane in Example 1 after 100 hours of operation.

Example 10

For 150% of the amount of maximum active oxygen, and a delivery rate of benzene of 400 g./h., the initial purity of the cyclohexane is only 99.90%, and after the fiftieth hour, the purity drops to a value of only 90%.

The catalyst of this invention can be employed for either total or partial hydrogenation reactions using various types of unsaturated compounds as starting materials, such as aromatic hydrocarbons, mono- and polyolefins, acetylenes, oils, esters, and unsaturated fatty acids and esters thereof. The same hydrogenation conditions conventionally employed in the presence of the corresponding pyrophoric catalysts are used. Such conditions are taught in the prior literature, for example generally comprising temperatures of 50–400° C., hydrogen pressures of 0.5–200 kg./cm.$^2$, and feed rates of about 0.5–2000 kg. starting material per kg. of catalyst per hour. Among the compounds which can be effectively hydrogenated with the catalysts of this invention are particularly: benzene, toluene, xylene, and naphthalene, converted respectively into cyclohexane, methyl cyclohexane, dimethyl cyclohexane, and tetrahydronaphthalene and decahydronaphthalene; and in addition, 4-vinyl-metadioxane, cyclohexene, piperylene, isooctene, linseed oil, caster oil, fish oils, pyrolysis products, lubricating oils, etc.

The catalyst can likewise be utilized in reductive amination processes, particularly wherein as the raw materials ketones are employed, notably acetone or cyclohexanone, to yield isopropylamine and cyclohexylamine, respectively.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A process of treating Raney-type catalysts to mitigate their pyrophoric properties, which process comprises the steps of:
   (a) removing a small sample of a metallic pyrophoric catalyst of the Raney-type from a mass of said catalyst and reacting said sample with an aqueous hypochlorite solution to determine the maximum ratio of active oxygen consumable by said catalyst; and
   (b) reacting the mass of said catalyst with an aqueous solution of an inorganic chemical oxidizing agent at a pH higher than 3, the ratio of said oxidizing agent to said mass of catalyst being 20–80% of the equivalent maximum ratio determined in step (a).

2. A process as defined in claim 1 wherein the Raney-type catalyst is produced from an alloy of Ni-Al, Ni-Si, Co-Al, or Co-Si by a process comprising reacting said alloy with an aqueous solution of a strong base and washing the resultant alloy with water to remove residual base.

3. A process as defined by claim 1 wherein the ratio of said oxidizing agent is 30–60% of the equivalent maximum ratio determined in step (a).

4. A process as defined by claim 2 wherein the ratio of said oxidizing agent is 30–60% of the equivalent maximum ratio determined in step (a).

5. A process as defined by claim 1 wherein said oxidizing agent is a hypochlorite of sodium, potassium or calcium.

6. A process as defined by claim 3 wherein said oxidizing agent is a hypochlorite of sodium, potassium or calcium.

7. A process as defined by claim 4 wherein said oxidizing agent is a hypochorite of sodium, potassium or calcium.

8. A process as defined by claim 1 wherein the pH is between 5 and 11, inclusive.

9. A process as defined by claim 8, characterized by a reaction temperature in step (b) of 0–100° C.

10. A process as defined by claim 8, characterized by a reaction temperature in step (b) of 20–50° C.

11. A process as defined by claim 1 wherein said chemical oxidizing agent is hydrogen peroxide.

12. A Raney-type catalyst, as produced by the process of claim 1 wherein the pyrophoric effect of said catalyst is reduced without significantly modifying its activity.

13. A non-pyrophoric catalyst of the Raney-type as produced by the process of claim 5, said catalyst having substantially the same activity as a catalyst which has not been treated to eliminate its pyrophoric property.

14. A process of treating Raney-type catalysts to mitigate their pyrophoric properties, which process comprises the steps of:
   (a) removing a sample of a metallic pyprophoric catalyst of the Raney-type from a mass of said catalyst and reacting said sample with a dissolved inorganic chemical oxidizing agent in aqueous solution at a pH higher than 3 to determine the maximum ratio of active oxygen consumable by said catalyst and
   (b) reacting the mass of said catalyst with the same chemical oxidizing agent and in the same conditions as according to step (a), except that the ratio of said oxidizing agent to said mass of catalyst being 20–80% of the maximum ratio determined in step (a).

15. A process as claimed in claim 14 wherein the chemical oxidizing agent is selected from the group consisting of sodium, potassium and calcium hypochlorites.

16. A process as claimed in claim 14, wherein the chemical oxidizing agent is hydrogen peroxide.

17. A process of treating oxygen-free Raney-type catalysts to mitigate their pyrophoric properties, which process comprises the step of reacting said catalyst with an aqueous solution of an inorganic oxidizing agent at a pH higher than 3, the amount of said inorganic oxidizing agent being in the range of 20–80% by weight of the maximum amount consumable by the catalyst, said inorganic oxidizing agent being selected from the group consisting of hydrogen peroxide and a hypochlorite.

18. A process of treating Raney-type catalysts to mitigate their pyrophoric properties, which process comprises the step of reacting said catalyst with an aqueous solution of an inorganic oxidizing agent selected from the group consisting of sodium, potassium, and calcium hypochlorites at a pH higher than 3, the amount of said inorganic oxidizing agent being in the range of 20–80% by weight of the maximum amount consumable by the catalyst.

References Cited

UNITED STATES PATENTS

| | | | |
|---|---|---|---|
| 1,915,473 | 6/1933 | Raney | 252—466 |
| 2,166,183 | 7/1939 | Signaigo | 252—477 |
| 2,191,464 | 2/1940 | Gwynn | 252—472 |
| 2,391,283 | 12/1945 | Weber et al. | 252—477 |
| 2,677,669 | 5/1954 | Ahlberg | 252—466 |
| 3,033,802 | 5/1962 | Pedigo | 252—472 |
| 3,139,408 | 6/1964 | Tumer et al. | 252—472 |
| 3,190,839 | 6/1965 | Hauschild et al. | 252—477 |
| 3,235,513 | 2/1966 | Jung et al. | 252—466 |

FOREIGN PATENTS 461,114  11/1949  Canada.

DANIEL E. WYMAN, *Primary Examiner.*

PAUL E. KONOPKA, *Assistant Examiner.*

U.S. Cl. X.R.

252—466, 477, 472